US007636785B2

(12) United States Patent
Shahine et al.

(10) Patent No.: US 7,636,785 B2
(45) Date of Patent: Dec. 22, 2009

(54) HEURISTIC DETERMINATION OF USER ORIGIN

(75) Inventors: Omar H. Shahine, San Francisco, CA (US); Arnold N. Blinn, Bellevue, WA (US); Pablo M. Stern, San Francisco, CA (US); Brian E. Arbogast, Seattle, WA (US); Alina Vikutan, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/990,703

(22) Filed: Nov. 16, 2004

(65) Prior Publication Data

US 2006/0106944 A1 May 18, 2006

(51) Int. Cl.
G06F 15/173 (2006.01)
G06Q 20/00 (2006.01)
(52) U.S. Cl. ............................ 709/228; 709/224; 705/64
(58) Field of Classification Search .................. 709/228
See application file for complete search history.

(56) References Cited

U.S. PATENT DOCUMENTS

| 5,724,659 | A | * | 3/1998 | Daniel et al. ............. 455/452.2 |
| 5,778,304 | A | * | 7/1998 | Grube et al. ............. 455/456.4 |
| 5,809,242 | A | * | 9/1998 | Shaw et al. ................. 709/217 |
| 5,862,325 | A | * | 1/1999 | Reed et al. .................. 709/201 |
| 5,991,376 | A | * | 11/1999 | Hennessy et al. ......... 379/114.1 |
| 6,470,387 | B1 | * | 10/2002 | Fischer ....................... 709/224 |
| 6,490,271 | B1 | * | 12/2002 | Erjanne ...................... 370/347 |
| 6,684,250 | B2 | * | 1/2004 | Anderson et al. ........... 709/225 |
| 6,721,580 | B1 | * | 4/2004 | Moon ......................... 455/574 |
| 6,757,740 | B1 | * | 6/2004 | Parekh et al. ............... 709/245 |
| 6,859,791 | B1 | * | 2/2005 | Spagna et al. ................. 705/51 |
| 6,895,236 | B2 | * | 5/2005 | Shuster ....................... 455/410 |
| 7,085,571 | B2 | * | 8/2006 | Kalhan et al. ............... 455/440 |
| 2001/0014911 | A1 | * | 8/2001 | Doi et al. .................... 709/221 |
| 2002/0029279 | A1 | * | 3/2002 | Campbell et al. ........... 709/229 |
| 2003/0172036 | A1 | * | 9/2003 | Feigenbaum ................. 705/64 |
| 2003/0217122 | A1 | * | 11/2003 | Roese et al. ................ 709/219 |
| 2003/0217137 | A1 | * | 11/2003 | Roese et al. ................ 709/223 |
| 2004/0047287 | A1 | * | 3/2004 | Tremblay et al. ........... 370/229 |
| 2004/0053605 | A1 | * | 3/2004 | Martyn et al. ............... 455/418 |
| 2004/0190448 | A1 | * | 9/2004 | Fishteyn et al. ............. 370/229 |
| 2005/0071417 | A1 | * | 3/2005 | Taylor et al. ................ 709/200 |

\* cited by examiner

*Primary Examiner*—Patrice Winder
*Assistant Examiner*—Taylor Elfervig
(74) *Attorney, Agent, or Firm*—Vierra Magen Marcus & DeNiro LLP (57) ABSTRACT

A system and method for independently determining the geographical location of a user accessing a networked system. The method may include gathering a plurality of inputs about the user's geographic location; weighting each input based on whether said input identifies a likelihood of true geographic location; determining whether each input verifies a geographic location specified by the user; and summing weights of the input factors verifying the specified geographic location. A system for independently determining the geographical location of a user includes a user login routine, a heuristic user geographic location determination engine, and at least one data store including a user profile record having a user specified geographic location.

26 Claims, 7 Drawing Sheets

HEURISTIC DETERMINATION OF USER ORIGIN

BACKGROUND OF THE INVENTION

1. Field of the Invention

The present invention is directed to distinguishing the physical location of users of a system coupled to a network such as the Internet.

2. Description of the Related Art

Companies who provide services over the Internet have an interest in determining with some certainty where individuals who use such services are geographically located. Users may have use preferences based on their location, and service providers can tailor service offerings based on location. In addition, providers may be concerned about providing services to regions where revenue generation is limited. In addition, legal restrictions on the types of services which may be provided to particular countries may exist.

While many service providers may simply ask users to specify their location, many providers would like to verify the user location in order to reduce risk. Additionally, providers can choose to reward users who correctly specify their location and/or penalize dishonest users. Hence, a system for independently determining the geographical location of a user would be useful.

SUMMARY OF THE INVENTION

In one aspect, the invention comprises a method for independently determining the geographical location of a user accessing a networked system. In one aspect, this may include comparing the determined geographic location to a user specified location.

In a further aspect, the method comprises: gathering a plurality of inputs about the user's geographic location; weighting each input based on whether said input identifies a likelihood of true graphic location; determining whether each input verifies a geographic location specified by the user; and summing weights of the input factors verifying the specified geographic location.

In an alternative embodiment, the method may include the steps of: gathering profile information about a user including a user specified location; determining a user location by summing one or more input factors based on a weight assigned each input factor according to an assurance such factor identifies a likelihood of true geographic origin; comparing a determined user location to the user specified location; and altering the user experience based on said step of comparing.

The invention may also comprise a system in a computing environment. In this aspect, the invention may include a user login routine; a heuristic user geographic location determination engine; and at least one data store including a user profile record having a user specified geographic location.

In yet another embodiment, the invention may comprise a method of providing an email service. The method may include the steps of: providing a network coupled system including code for providing an email service to users; obtaining profile information about a user including a specified user location; heuristically determining a user location; comparing a determined user location to the user specified location; and varying the email service based on said step of comparing.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

In general, the invention provides a method and system for determining the geographical location of a user accessing a network system. In one aspect, the network may be any type of LAN or WAN, is a combination of public and private networks, such as the Internet. The geographical location of users accessing a network system or service may be important to a system administrator who may seek to provide services, or provide enhanced services, based on the geographical location of the user. The system of the present invention allows system administrator to tailor services based on the geographical location of a user with some certainty that the geographical location can be verified to some reasonable degree of certainty.

Figure 1:
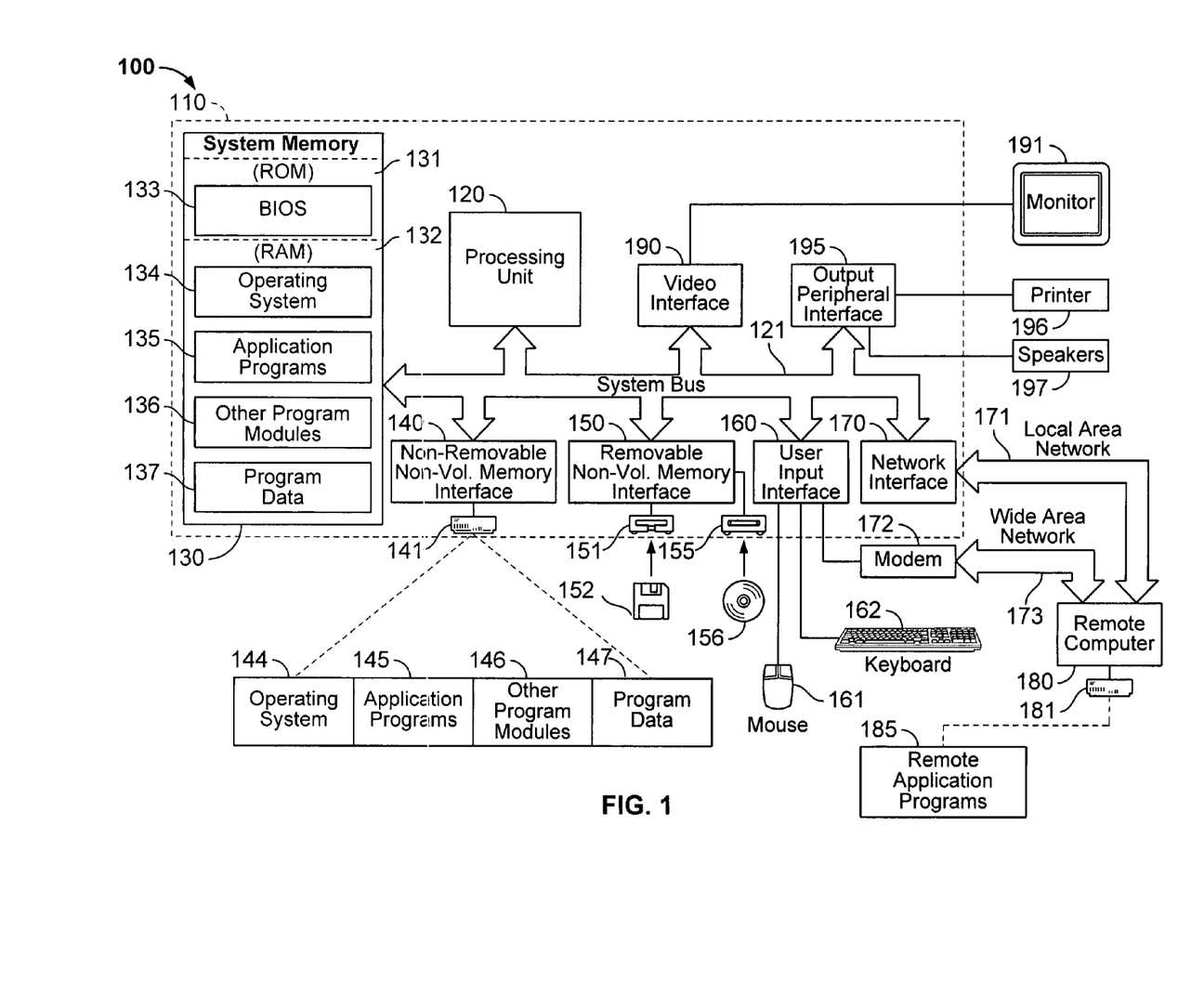
FIG. 1 depicts a block diagram of computer hardware suitable for implementing the invention.

In one aspect, the invention may be performed on one or more processing devices or general computing systems. FIG. 1 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, date structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figures 2, 3:
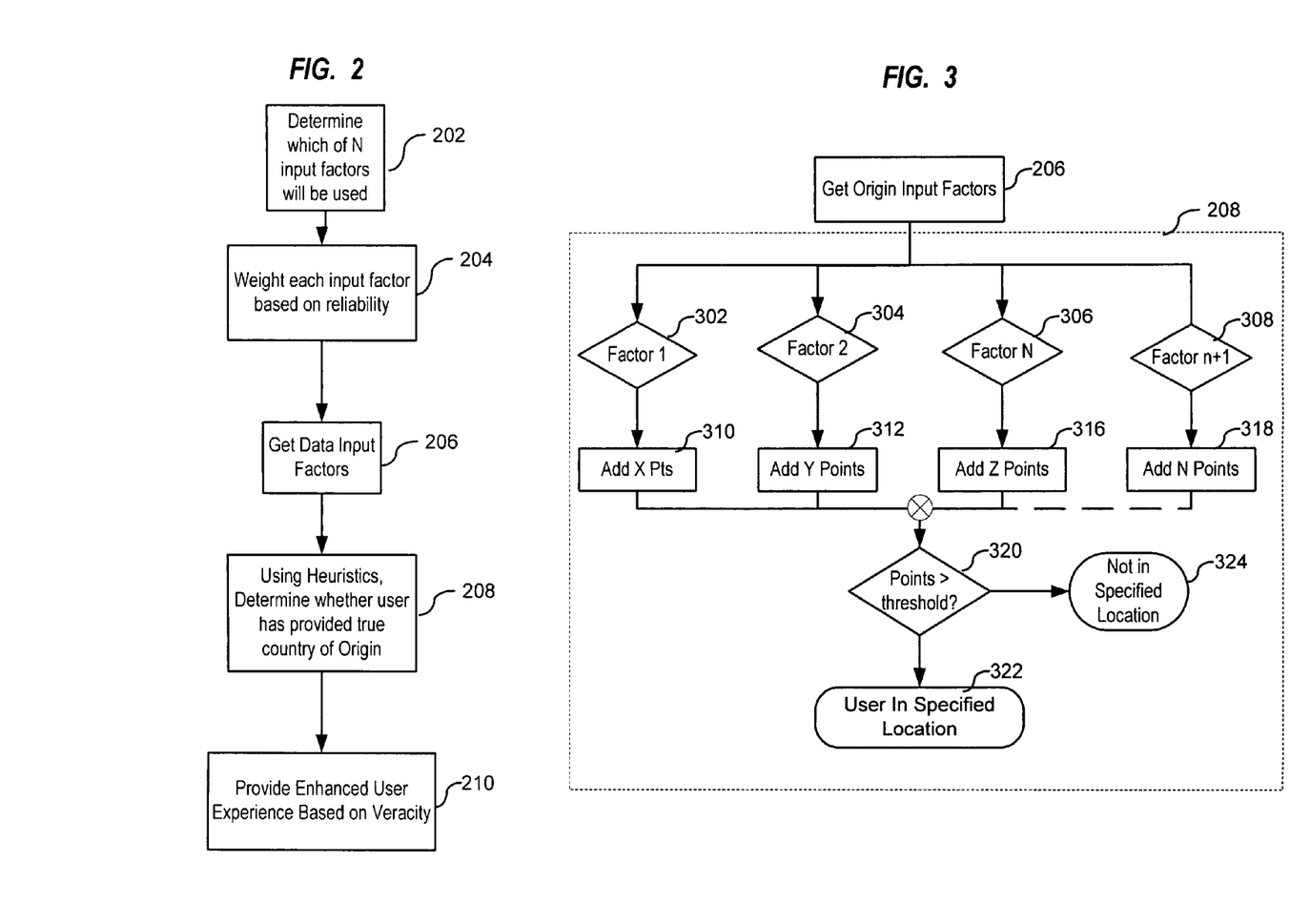
FIG. 2 is a flowchart depicting a method for determining the geographical origin of a user in accordance with the present invention.
FIG. 3 is a flowchart depicting the general heuristic determination method in accordance with the present invention.

FIG. 2 shows a general method of the present invention for determining a user location using heuristics in accordance with the present invention. In FIG. 2 steps 202 and 204 may be performed by the user once, or many times, and may be temporally separated from steps 206, 208 and 210. Steps 202 and 204 comprise set-up steps for one embodiment of the method of the invention. The method uses a number of inputs, weighted according to one's certainty about the result provided by a test on such input factor, to determine the location of a user accessing a system.

At step 202, the system administrator determines which of any number of input factors are to be utilized in the determination. In this context, the System Administrator is an entity that could be a human or potential automated algorithm. For geographic location, the input factors can comprise any number of items, including, but not limited to: the type of IP address the user is logging in from, (with types including information such as whether the IP is a broadband, anonymous, proxy server, or AOL address); the location of the user, by continent, or region; the time zone that the user is logging in from; the latitude, or longitude of the IP; the IP routing type; and/or numerous other factors. These inputs can be determined from any number of sources. In one embodiment, the system administrator can gather data and maintain its own database of know geographic IP addresses. In another embodiment, commercially available services provide information about a login IP address for use by the administrator in its own algorithm.

In yet another aspect, a system administrator may gather certain types of information from the user themselves by requiring a user to provide a profile of information as part of a registration process prior to login onto the service provided. Such profile information may include name, address, zip code, time zone, country, phone number, language, credit card, and email addresses, as well as other such information to allow the user to gain access to the system.

Next, at step 204, the system administrator assigns a weight to each input factor chosen for evaluation. In one embodiment, the weight assigned is based on the factor's reliability in determining the geographical location of the user. For example, if an IP block is known to originate in a proxy server in China, one might assign the login IP factor a higher weight than, for example, a browser language specification in the user profile. In a browser language specification, it might be possible for a user to lie and input a language of, for example, English to pretend to be in the United States, while actually being logged in from China. It should be recognized that alternative weighting algorithms can be used. For example, one can assign weights to each different feature based on a set of "trusted" information or a control group. In addition, the weighted algorithm may be automated, or supplemented by a machine learning algorithm which can optimize the weighting scheme.

As noted above, steps 202 and 204 comprise set-up steps for the method of the invention. Once these steps are completed, evaluation steps 206 and 208 may occur.

At step 206, data for each of the input factors for a given user is gathered. For example, each time a user registers with the system administrator, logs into the system, or at a timed specific interval, the input factors can be gathered and provided to a heuristic geographic location determination at step 208. In step 208, an independent determination can made as to whether the user has provided a true indication of the user's country of origin. Once the determination is made at step 208, at step 210, the information can be utilized by the system administrator or algorithm to vary the user experience or penalize the user based on the veracity of the user. Localized information can be used for other purposes as well, such as to provide localized content on customized web pages such as MY Yahoo or MY MSN.

FIG. 3 shows a more detailed view of the heuristic determination step 208. In FIG. 3, a number of input factors have been determined and data for an individual user accessing the system is obtained at step 206. For each input factor (1, 2, N, . . . N+1) a decision 302, 304, 306, 308 is made with respect to whether or not the factor indicates the true country of origin of the user. If the factor verifies the user's stated country of origin, a number of points is assigned for each factor at steps 310, 312, 316, 318 according to the weight assigned to the factor by the system administrator. At step 320, the summed number of points is compared against a threshold. If the threshold is met or exceeded at step 320, the user is determined to be located in the specified location 322. If the threshold is not exceeded, the user is determined not to be in a specified location 324. As will be readily determined, a number of points may be utilized for each factor, and the points are assigned based on the assurance one has that the truth of a particular factor can be verified to be correct. As will be readily apparent, any number of factors, each having an assigned weight may be utilized. The input factors may provide varying degrees of granularity with respect to location. In one embodiment, a user's country or region may be determined; in other embodiments, the user's city may be determined. The nature of the granularity is dependent on the factors used in the determination. Likewise, the threshold may be set such that any one or more factors, if valid, may exceed the threshold, or the system administrator may require multiple factors all be valid to exceed the threshold.

Figure 4:
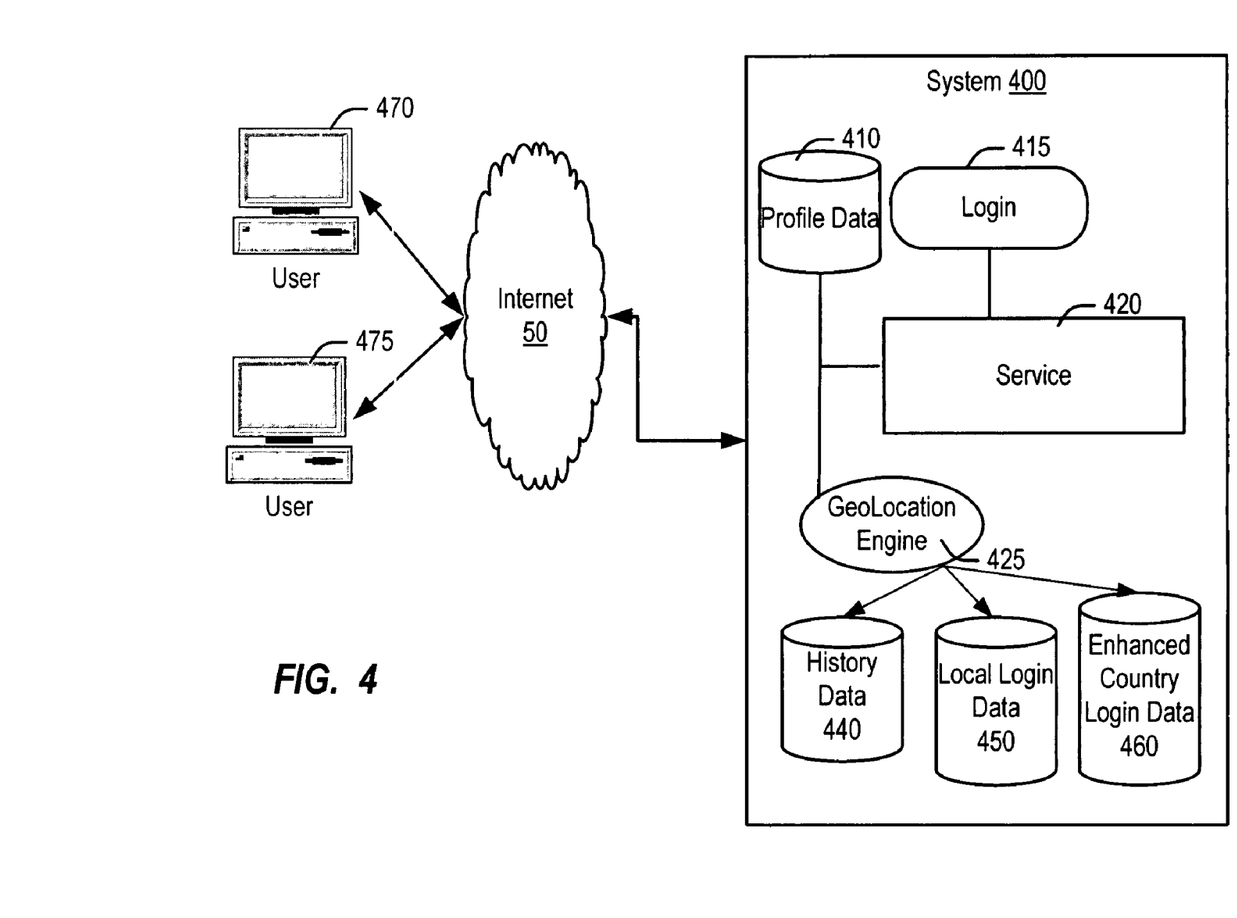
FIG. 4 is a block diagram of a system for implementing the present invention.

As noted above, in one embodiment, the invention may be utilized in determining a user accessing a networked system. FIG. 4 shows an example of two users 470, 475 accessing a networked system 400 which provides a service via a network such as the Internet 50. System 400 may be a processing device as shown in FIG. 1 or equivalent. Likewise, each user may be accessing system 400 using a processing device as described with respect to FIG. 1 or its equivalent. System 400 includes code for implementing a service 420 which is provided to the user by the system administrator. In conjunction with the service 420, the system administrator may require a user to provide login information using a login module 415, and enter profile information which may be stored in a profile data store 410. Also shown in FIG. 4 is a geographic location engine 425 comprising code for instructing the system processing device 400 to perform the method in accordance with the present invention. System 400 may also include data stores for retaining additional information about the user relative to the user's location. These include a location history data store 440, a local login data store 450 and an enhanced country login data store 460. As will be explained in further detail below, these data stores 440, 450 and 460 can be used to provide varying levels of the service 420 to users based on the user's veracity in providing location information to the administrator.

While the system can be used to provide any type of service, a specific embodiment of the invention is discussed below in the context of providing an enhanced email service. In this context, the service code 320 may comprise code for providing an on-line email service such as Microsoft® Hotmail. In one variation of providing this service, described below, the enhanced service is based on both the veracity of the user in specifying the user's login location, and whether the user is logging in from a specific country, referred to herein as an "enhanced country". The method accounts for the possibility that countries defined as being enhanced countries may change over time.

Figure 5:
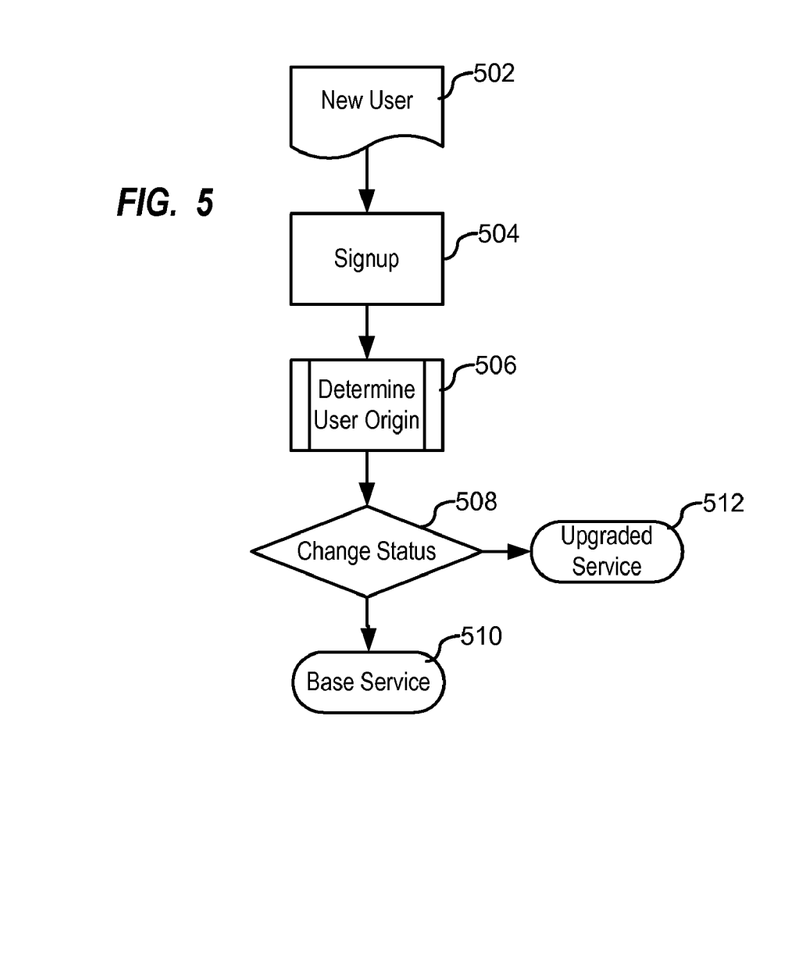
FIG. 5 is a flowchart depicting a method for using the determination method of the present invention in administering a service or system requiring a user login.

In the context of providing a service, the system administrator may require users to establish a login account before providing the service to the user. In this context, the administrator may gather profile information about users. FIG. 5 shows use of the method of the present invention when establishing a new user for the service.

In FIG. 5, a new user 502 must first establish a service login by performing a signup procedure at step 504. The signup procedure 504 can be a forms or prompt driven process for gathering profile information which can include the first name, last name, email address, country or region that the user is logging in from, the gender of the user, the birth date and the occupation of the user. In addition, the user may be asked to specify a time zone. As noted above, such information may be provided in a data store such as profile data store 410.

At step 506, the geographic location method of the present invention makes an independent determination of user origin using the algorithm described in FIG. 3. In one aspect, this may comprise using the exemplary algorithm shown in FIG. 7. Based on the information provided at step 504 and the independent determination at step 506, a decision can be made at step 508 as to whether the user should be provided with an upgraded service, 512, or base service 510.

Figure 6:
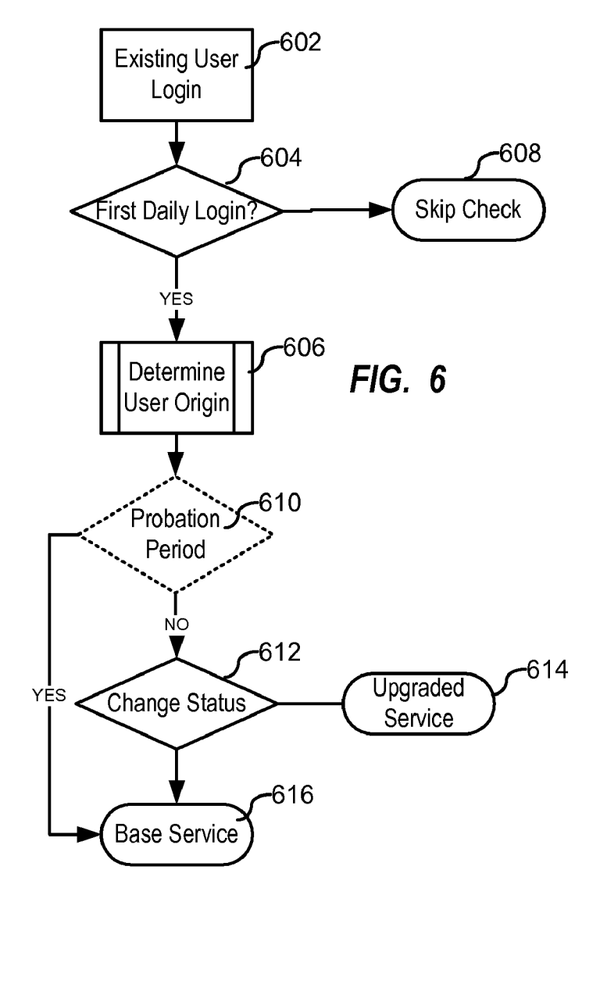
FIG. 6 is a flowchart depicting a method for using the determination method of the present invention in a repeated login service or system requiring a user login.
Figure 7:
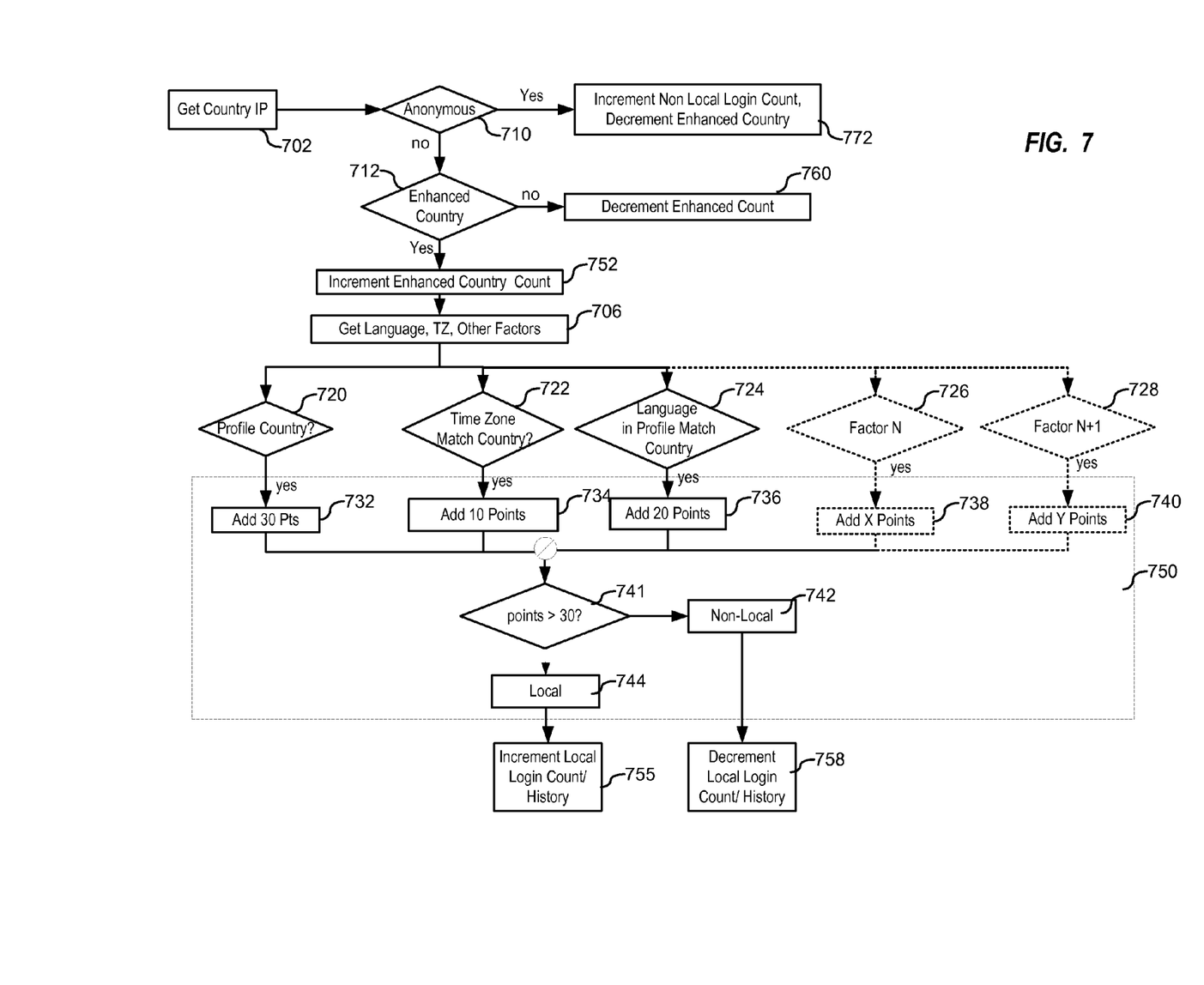
FIG. 7 is a flowchart depicting one example of implementing the method of the present invention in a service provided by a system administrator to provide an enhanced email service.

FIG. 6 shows use of the geographical location method of the present invention with established users. At step 602 when an existing user logs in, the system first checks at step 604 to determine whether this is the first daily login of the user. If it is not the first time the user has logged in on a given day, the system does not perform an independent geographical location determination at step 606, but skips it at step 608. It should be noted that the frequency of the independent determination step may be varied at the control of the administrator. If it is the first daily login of the user as determined at step 604, then the geographic location method of FIG. 3 or FIG. 7 is run in step 608. This independent determination can be used by the administrator to provide an upgraded service or a base service. It should be noted that the decision at step 612 may be to perform other actions other than providing an upgraded service, including penalizing the user for specifying an incorrect location. In an optional step, indicated in phantom at 610, a probation period may be implemented at step 610. The provision period may be implemented at step 610. The probation period may allow the system administrator to retain the benefits of an enhanced service (or penalty) until the user has been a member of the service for a specific period of time. If the probation system is implemented at step 610, then unless the probation period is determined to be over, the base service will be provided at step 616. If the probation period is over, then a status change decision is made at step 612. The status change decision can be implemented using any number of factors, as described below. One such factor may be the veracity of the user in specifying the user's point of origin or other information, with the loyalty of the user in continually using the system over a certain number of logins over a certain period.

It should be further recognized that the terms "base service" and "upgraded service" may include any number of individual features comprising a feature set. For example, where the method is used in conjunction with an email service, the base service may comprise providing the user with a 2 MB storage account, and the upgraded service may be providing a 25 MB storage account. After several additional logins or a probationary period, the upgraded service may be a higher level account, (for example, a 250 MB storage account,) with the 25 MB account serving as the "base service". Other features may include extending a period of account inactivity allowed before the account is deactivated. Each such feature set may be defined in terms of a user location and/or the user's veracity with respect to whether the user is logging in from the location they specify.

FIG. 7 shows one implementation of the decision steps 506, 606 of FIGS. 5 and 6 respectively. In the implementation of FIG. 7, three inputs are used: a user's Internet Protocol (IP) address 702, the browser language specified in a user's profile, and the time zone specified in the user. In one aspect, the user's login IP can be associated with country or location information and is provided by a commercially available provider of geographic information tied to IP data, such as Quova, Inc. Data provided by such a service specifies whether a given IP is from a particular country. Data is provided through an application programming interface to allow system administrator to use its own decision making process to determine where the users are geographically located. Alternatively, the administrator may maintain a database of login IPs verified by the administrator to have come from specific geographic locations.

In FIG. 7, one aspect of the country IP look-up data 702 is an indication of whether the user is using an anonymous IP. An anonymous IP in this context means that the user is accessing the service with an anonymous proxy server to cloak the user's true IP address. If a user is using an anonymous IP, at step 710, a determination is made by the system administrator not to offer an enhanced service to such a user. As noted above, a system for implementing the invention may include a history data store 440, a local login data store 450, and an enhanced country login data store 460. If the user has logged in from an anonymous IP address, a counter in the local login data store is decremented and a counter in the enhanced country data store is decremented at step 772. The enhanced country count retains a record of whether or not the user is verified to have logged in from a country which is in the list of countries which the administrator has decided to offer the enhanced services. The local login counter maintains a record of whether or not the user actually logging in from the geographical location which the user has specified that the user logs in from.

If the country IP look-up is determined not to be anonymous at step 710, a determination is made at step 712 to whether the country is an enhanced country. If so, the enhanced country login count is incremented at step 752. If not, the count is decremented at step 760. In order to account for the possibility that countries defined as being enhanced countries may change over time, in one embodiment, the enhanced country login counter is never decremented below zero. This prevents users in countries which are not part of the initial list, but which are added to the list later, from being penalized by having a decremented count go below zero.

If the IP lookup results in a non-anonymous determination, and the country is an enhanced country, then the input factors are gathered at step 706 and provided to decision steps 720, 722, and 724. While in one embodiment, three input factors are used, it will be recognized that additional input factors 726 and 728 (shown in phantom) may be used depending on the granularity and specificity of the determination desired.

The profile country decision 720 determines whether the input country login IP matches the user's specified country. The time zone decision 722 determines whether the time zone data from the user login matches the time zone which would be found in the country which the user specified in the user's profile. For example, a determination is made as to whether the login time of the user matches the time zone for North America to verify that the user is in fact in a North American region. The browser language decision determines whether the user's login browser language setting matches the user's profile language. This would prevent a user in, for example, China, specifying that the browser language should be English when in fact the user is using Chinese. In such a situation, it is more likely that the user is in fact in China.

For each valid result of steps 720, 722, 724, a number of points are assigned based on the weighting factors which the system administrator determined the factor is worth. For example, the profile country is matched with the country IP from which the user is logging into, 30 points are added at step 732; if the time zone matches the country at 722, 10 points are added at 734, and if the language and profile matches the login country, then 20 points are added at 736. The number of points is then summed and at step 740, if the sum is greater than a specified threshold, the user is determined to be making a local login. In this example, the threshold is 30 points. If the user has greater than or equal to 30 points as a result of the answers at step 720, 722, 724, then the user is determined to have made a local login at step 750 and the local login count and history record are updated at 755. If not, the user is making a non-local login at step 752 and the counts are decremented accordingly at 758. Alternative thresholds may be set, depending on how the factors are weighted and used. In one alternative, for example, one factor (for example, Factor N) is set as a time counter which tests true when the user has logged in after an allotted period of time has passed since the user's first login. In this example, the counter may add some number of points, for example 10 per login per day or X points over a specific period, and the threshold increased to account for the desired delay in determining a valid local login. For example, a user may be required to login three times at least one day after the user's initial login from the same point, adding thirty points to the total number calculated, with the threshold increased to 60 to result in a valid local login.

In the embodiment of FIG. 7, the country IP lookup by itself is deemed sufficient to overcome the threshold. Alternatively, a match of the time zone and language tests 722 or 724 will overcome the threshold. It will be recognized that a unique element of the invention is the ability to vary the factors, weights and threshold to provide an increased or decreased level of certainty in the geographical location determination.

Using the data in the enhanced country counter and the local login counter, the system administrator can determine whether to change the user status at steps 508 or 612. For example, if the user is determined to be logging in from a country in which an enhanced service is provided, and is determined to have made a successful local login, the enhanced service can be provided.

In one embodiment, an additional factor which may be considered in the method of FIG. 7 (in factor 726 or 728) may comprise input from user supplied or third party content distribution networks. Content distribution networks provide web content to so-called "edge" servers—servers which are closer in proximity (either network routing proximity or geographic proximity) to a user than a service provider's main hosting environment may be. The content distribution network stores information from other web servers and responds to user requests for information from the service provider's web server. The service provider can obtain information on the geographical location of a user by taking as input to the method of FIG. 7 information on which edge server is responding to a particular user. Such information can come from companies who provide content distribution networks, such as Akamai Technologies, Inc., of Cambridge, Mass., or from a content network built by the service provider itself using devices such as those available from Netscaler, Inc. of San Jose, Calif. Users seeking to circumvent such content distribution networks will generally suffer severely degraded performance, Hence, the weighting of each factor 720, 722, 724, and this factor may be altered according to the assurance one has that data from the distribution network is likely a correct indicator of geographic location based on the server being used to access the administrator's service.

As noted above, in certain implementations, the enhanced user login counter may not be decremented below zero. In one aspect, the local login counter may be decremented below zero. This counter, in conjunction with the history information, is retained by the system administrator and may be used to reward the user or penalize users who repeatedly attempt to use the service dishonestly.

In another embodiment, enhanced services can be tracked and provided for individual countries or features, and the criteria for upgrading or downgrading each individual feature maintained separately. For example, assume users in countries A and B should be provided with enhanced services after a 30 day probation period, but users in country C should only be provided with enhanced services after 60 days. In another example, users in countries A, B and C are all provided with enhanced service after a probation period, but users in country C should deactivated or downgraded from the enhanced service to a basic service after some period of inactivity.

Figure 8:
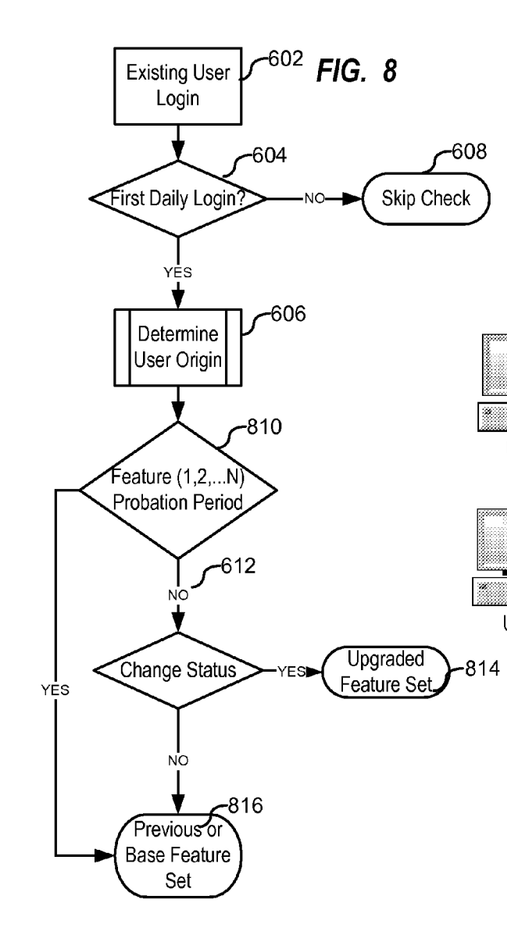
FIG. 8 is a flowchart depicting an alternative method for using the determination method of the present invention in a repeated login service or system requiring a user login.

FIG. 8 shows an alternative method of the present invention for determining probation periods based on a feature definition, and upgrading users to multiple levels of feature sets. Steps which are equivalent to those set forth in FIG. 6 are identically numbered.

In FIG. 8, the probation period determination step 810 is made on a per feature basis. Different features or feature sets can have different probation periods, so that step 810 may be calculated for different feature sets after a first upgraded feature set is provided. Which features or feature sets are provided, or how long a user must wait to be provided such feature, can be dependent on the location of the user. For example, step 810 may define a first feature set including an upgrade from a base feature set or service to a second level of service after a first period. While the user is in a first feature set probation period they are given their base or existing level of service at step 816. Once the probation period is reached, a second feature set probation period is checked in step 810, until the next upgraded period is reached, when they are upgraded to the next level at step 814.

Figure 9:
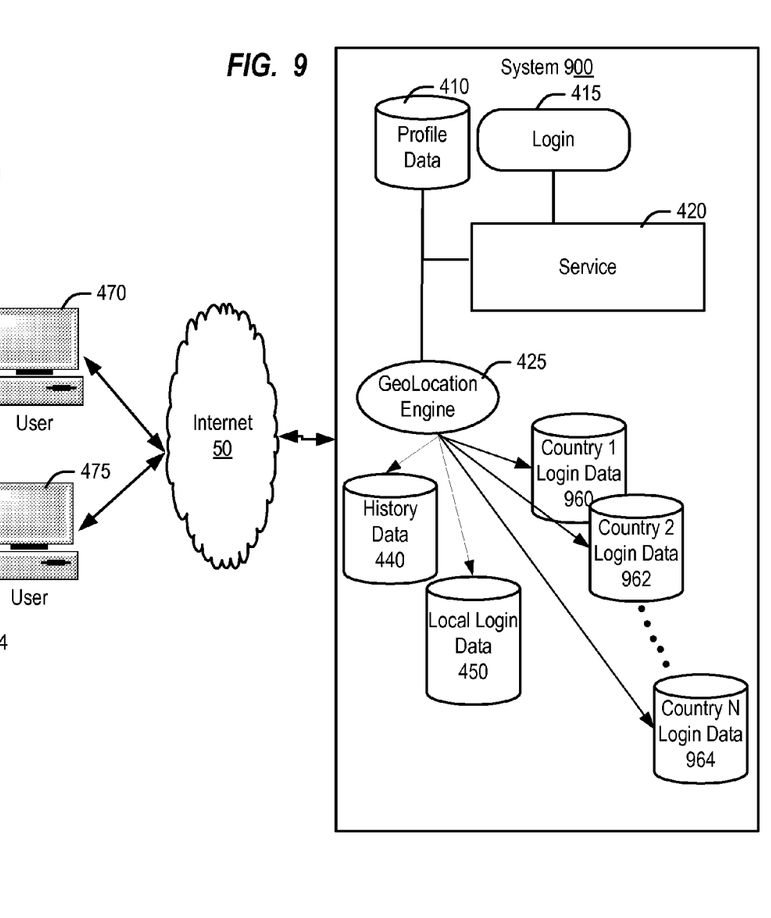
FIG. 9 is a block diagram of an alternative system for implementing the present invention.

FIG. 9 shows an alternative implementation of the system of FIG. 4, wherein individual country counters 960, 962, and 964 are used to track user data on a per country basis. Elements of the system of FIG. 9 corresponding to those in FIG. 4 are identically numbered. Alternatively, counters 960, 962, and 964 are used to track user data on a per feature basis. In an alternate implementation, counters may be provided on a per feature basis, and one can increment and decrement each per feature counters if the user is in an enhanced country where that feature is available. Where the counters are feature counters, in the above example, an enhanced feature in a given country may be tracked using such counters to ensure the user is in the enhanced country during the probation period.

Figure 10:
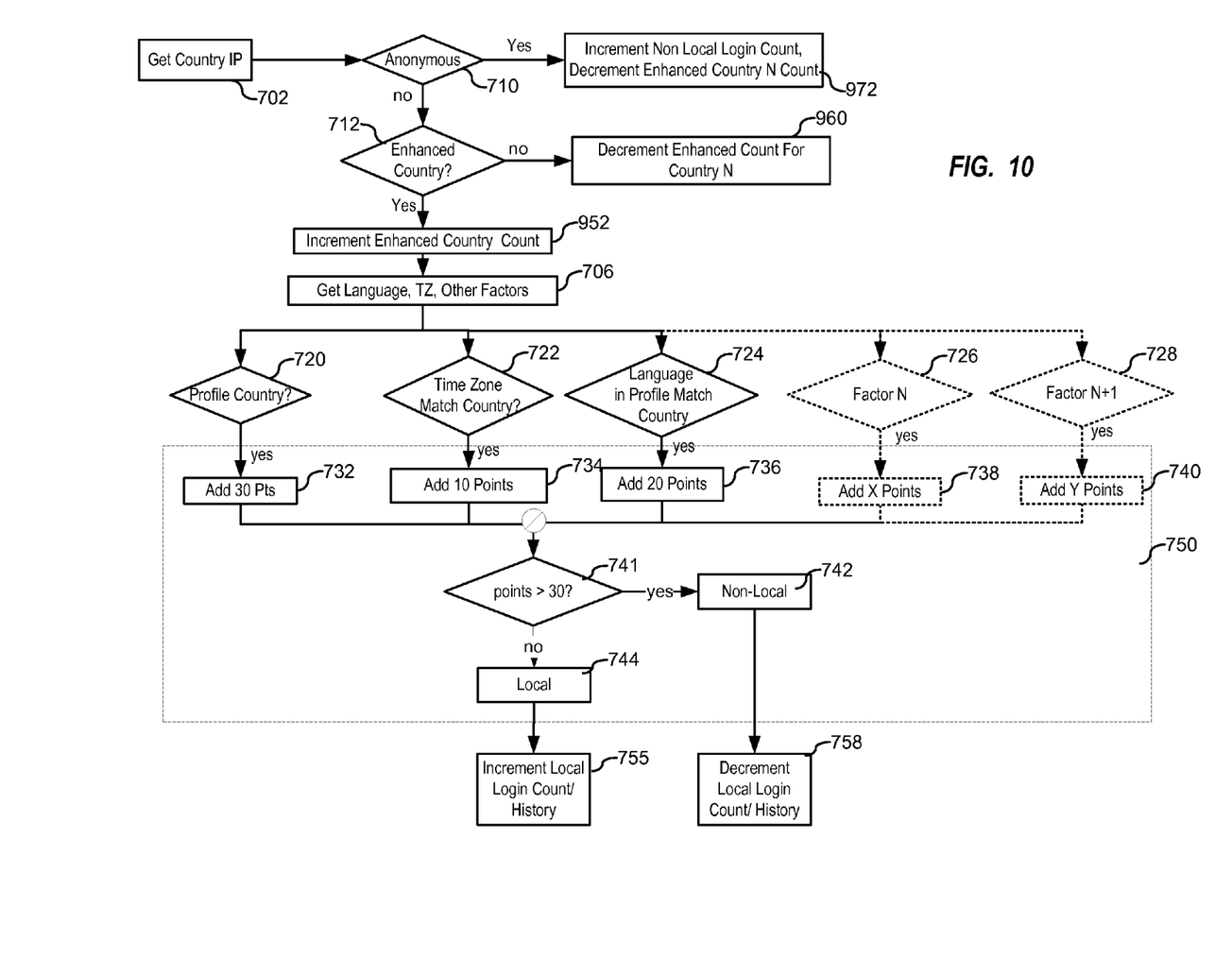
FIG. 10 is a flowchart depicting an alternative example of implementing the method of the present invention in a service provided by a system administrator to provide an enhanced email service.

Counters 960, 962, and 964 may be used by the alternative method of FIG. 10, an alternative to the method of FIG. 7, to track user information to provide enhanced feature sets as discussed above. Steps in the method of FIG. 10 which are equivalent to those set forth in FIG. 7 are identically numbered. In FIG. 10, steps 972, and 952 increment, and step 960 decrements, the per country (or per feature) login counts based on the determination of the anonymous login at step 710 or enhanced country login at step 712.

In a further aspect of the invention, the system administrator may provide users with an opportunity to prove their origin. In cases where the independent geographical location determination specifies a user is not in the country they allege to be from, a user can be provided with the opportunity to prove they reside in an eligible enhanced country. In one aspect, this may include sending a posted letter to the user's address with a product key that the user can enter into the login service, sending an SMS message to a user's cell phone using the correct country code, or obtaining credit card information to verify the country.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of determining a geographical location of a user, comprising:
   receiving profile information about a user including a user specified current location, the profile information including input data for at least a subset of location determination factors identifying the current geographical location of the user;
   determining a user location by summing one or more location determination factors based on a weight assigned each location determination factor according to an likelihood such factor identifies a true geographic origin;
   comparing a determined user location to the user specified location to determine the veracity of the user specified location;
   altering the user experience based on said step of comparing;
   recording the output of the comparing step; and
   rewarding users for whom the output of the comparing step has been recorded to be a match over a threshold number of times.

2. The method of claim 1 where the step of altering provides a different user experience for users in different geographic locations.

3. The method of claim 2 wherein the user experience includes providing multiple features and said different user experience comprises providing different sets of said multiple features for users based on a specific geographic region.

4. The method of claim 1 wherein the step of determining comprises:
   weighting each location determination factor based on whether said factor identifies a likelihood of true geographic location;
   determining whether each factor verifies a geographic location specified by the user, and
   summing weights of the input factors verifying the specified geographic location.

5. The method of claim 4 further including the step of determining the user is in the specified geographical location when said step of summing provides a value above a threshold.

6. The method of claim 5 wherein the step of determining is performed on a per country basis.

7. The method of claim 5 wherein said step of weighting includes assigning a weight greater than or equal to said threshold to at least one of said factors.

8. The method of claim 1 wherein said step of altering the user experience includes providing the user with an enhanced service when said step of comparing is a match.

9. The method of claim 1 wherein the step of altering the user experience includes penalizing the user when said step of comparing is not a match.

10. The method of claim 1 wherein said step of rewarding is performed after a probation period.

11. The method of claim 1 wherein the step of altering is reversed after a user ceases use of an account for a specified period.

12. The method of claim 1 wherein said step of altering the user experience comprises providing localized content to the user.

13. The method of claim 1 wherein said location determination factors include a login IP address.

14. The method of claim 13 wherein the login IP address is associated with a geographic location.

15. In a computing environment, a system comprising:
   a user login routine including a login counter;
   a heuristic user geographic location determination engine including code for instructing a processor to perform the steps of
     receiving input data for at least a subset of said inputs in the form of user provided information identifying the current geographical location of the user, including a user-specified current geographic location;
     weighting each input based on whether said input identifies a likelihood of true geographic location;
     determining whether data received for one or more input verifies the user-specified geographic location specified by the user, and
     summing weights of those input factors verifying the user-specified geographic location to determine the veracity of the user-specified entry; and at least one data store including a user profile record having a user specified geographic location, wherein the login counter is incremented by the determination engine when the determination outputs a geographic location matching the specified geographic location, and wherein an enhanced service is provided by the system when a value of the login counter value exceeds a threshold.

16. The system of claim 15 wherein the login counter is decremented by the determination engine when the determination outputs a geographic location not matching the specified geographic location.

17. The system of claim 15 wherein the login counter is decremented to a minimum of zero by the determination engine when the determination outputs a geographic location not matching the specified geographic location.

18. A method of providing an email service, comprising:
providing a network coupled system including code for providing an email service to users;
obtaining profile information about a user including a specified user current location and data concerning one or more user specified location factors;
heuristically determining a user current location when a user accesses the network coupled system
weighting each input based on whether said input identifies a likelihood of true geographic location;
determining whether data received for each input verifies the user-specified geographic location, and
summing weights of those input factors verifying the user-specified geographic location to determine the veracity of the user-specified entry;
comparing a determined user location to the user specified location; and
varying the email service based on said step of comparing, including
providing an enhanced feature set if the user specified location matches the determined user location and
providing a reduced feature set if the user specified location does not match the determined user location, and
providing an improved quantity of service when the step of comparing is a match over a threshold number of times, or after a probationary period.

19. The method of claim 18 further including providing a base service, an intermediate level of service, and an enhanced service, and wherein said step of varying includes providing the intermediate level of service when said comparing step is a match over a first threshold number of times.

20. The method of claim 18 further wherein said step of varying includes providing the enhanced service after the probationary period when said comparing step is a match over a second threshold number of times.

21. The method of claim 18 further including the step of providing a user location verification proof if the specified user location does not match the user location determined in said heuristically determining step.

22. The method of claim 21 wherein the user verification proof includes sending a message to a user specified geographically verified mobile phone.

23. The method of claim 22 wherein the user verification proof includes sending a short message service message with a country code matching the specified user location.

24. The method of claim 23 wherein the method further includes the step of varying the email service upon verification of the user specified location.

25. The method of claim 21 wherein the user verification proof includes sending a letter to a postal address in the user specified location including a location verification key.

26. The method of claim 21 wherein the user verification proof includes obtaining credit card information verifying the user specified location.

* * * * *

UNITED STATES PATENT AND TRADEMARK OFFICE
CERTIFICATE OF CORRECTION

PATENT NO. : 7,636,785 B2 Page 1 of 1
APPLICATION NO. : 10/990703
DATED : December 22, 2009
INVENTOR(S) : Shahine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Ninth Day of November, 2010

David J. Kappos
*Director of the United States Patent and Trademark Office*